(12) United States Patent
Hsu

(10) Patent No.: US 6,785,343 B1
(45) Date of Patent: Aug. 31, 2004

(54) RECTANGULAR-TO-POLAR CONVERSION ANGLE QUANTIZER

(75) Inventor: Hanna S. Hsu, Cerritos, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 739 days.

(21) Appl. No.: 09/693,759

(22) Filed: Oct. 20, 2000

(51) Int. Cl.[7] .............................................. H04L 27/22
(52) U.S. Cl. ..................................... 375/316; 375/329
(58) Field of Search .................................. 375/245, 259, 375/271, 279, 284, 316, 329, 340; 708/809; 341/200; 329/304

(56) References Cited

U.S. PATENT DOCUMENTS

| 3,575,593 A | * | 4/1971 | Staples | 708/809 |
| 5,295,162 A | * | 3/1994 | Zarembowitch | 375/329 |
| 6,084,923 A | * | 7/2000 | Cullen | 375/329 |
| 6,255,906 B1 | * | 7/2001 | Eidson et al. | 330/124 R |

\* cited by examiner

Primary Examiner—Chieh M. Fan (57) ABSTRACT

A normalizer (70) truncates a variable plurality of numbers of least significant bits of input I and Q words representing an original phase angle in rectangular coordinates. A read only memory (90') generates a phase signal representing a resultant phase angle range in polar coordinates that includes the original phase angle.

10 Claims, 11 Drawing Sheets

New Phase ROM Table (4-Bit Angle Representation Based on Average of Mid-Ranges, SIW)

| Q\I | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 15 | 15 | 15 | 14 | 14 | 13 | 13 | 12 | 12 | 11 | 11 | 10 | 10 | 9 | 9 | 8 |
| 14 | 15 | 15 | 15 | 14 | 14 | 13 | 13 | 12 | 11 | 11 | 10 | 10 | 9 | 9 | 8 | 8 |
| 13 | 15 | 15 | 14 | 14 | 13 | 13 | 12 | 12 | 11 | 10 | 10 | 9 | 9 | 8 | 8 | 7 |
| 12 | 15 | 15 | 14 | 14 | 13 | 12 | 12 | 11 | 11 | 10 | 9 | 9 | 8 | 8 | 7 | 7 |
| 11 | 15 | 15 | 14 | 13 | 13 | 12 | 11 | 11 | 10 | 10 | 9 | 8 | 8 | 7 | 7 | 6 |
| 10 | 15 | 15 | 14 | 13 | 12 | 12 | 11 | 10 | 10 | 9 | 8 | 8 | 7 | 7 | 6 | 6 |
| 9 | 15 | 14 | 14 | 13 | 12 | 11 | 11 | 10 | 9 | 9 | 8 | 8 | 7 | 6 | 6 | 6 |
| 8 | 15 | 14 | 13 | 12 | 12 | 11 | 10 | 10 | 9 | 8 | 8 | 7 | 6 | 6 | 5 | 5 |
| 7 | 15 | 14 | 13 | 12 | 11 | 11 | 10 | 9 | 8 | 8 | 7 | 6 | 6 | 5 | 5 | 4 |
| 6 | 15 | 14 | 13 | 12 | 11 | 10 | 9 | 8 | 8 | 7 | 6 | 5 | 5 | 4 | 4 | 3 |
| 5 | 15 | 13 | 12 | 11 | 10 | 9 | 9 | 8 | 7 | 6 | 5 | 4 | 4 | 3 | 3 | 3 |
| 4 | 15 | 13 | 12 | 11 | 10 | 9 | 8 | 7 | 6 | 5 | 4 | 3 | 3 | 3 | 2 | 2 |
| 3 | 15 | 12 | 11 | 10 | 9 | 8 | 6 | 5 | 4 | 3 | 3 | 2 | 2 | 1 | 1 | 1 |
| 2 | 15 | 10 | 9 | 8 | 6 | 5 | 4 | 3 | 3 | 2 | 2 | 1 | 1 | 1 | 0 | 0 |
| 1 | 14 | 8 | 5 | 3 | 2 | 2 | 1 | 1 | 0 | 0 | 0 | 0 | 0 | 0 | 0 | 0 |
| 0 | 6 | 2 | 1 | 0 | 0 | 0 | 0 | 0 | 0 | 0 | 0 | 0 | 0 | 0 | 0 | 0 |

Figure 3

Average (Assuming Equal Likelihood of Truncating 3, 2, 1, or 0 LSB)

| $Q^\wedge, I>$ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 88.99 | 85.24 | 81.54 | 77.91 | 74.37 | 70.96 | 67.67 | 64.54 | 61.56 | 58.74 | 56.08 | 53.57 | 51.22 | 49.01 | 46.94 | 45.00 |
| 14 | 88.91 | 84.91 | 80.96 | 77.09 | 73.34 | 69.73 | 66.28 | 63.00 | 59.90 | 56.99 | 54.26 | 51.70 | 49.31 | 47.08 | 45.00 | 43.06 |
| 13 | 88.83 | 84.53 | 80.29 | 76.15 | 72.16 | 68.34 | 64.71 | 61.28 | 58.07 | 55.06 | 52.26 | 49.66 | 47.24 | 45.00 | 42.92 | 40.99 |
| 12 | 88.73 | 84.08 | 79.51 | 75.07 | 70.81 | 66.75 | 62.93 | 59.35 | 56.02 | 52.93 | 50.07 | 47.43 | 45.00 | 42.76 | 40.69 | 38.78 |
| 11 | 88.62 | 83.56 | 78.60 | 73.81 | 69.24 | 64.93 | 60.91 | 57.17 | 53.73 | 50.56 | 47.66 | 45.00 | 42.57 | 40.34 | 38.30 | 36.43 |
| 10 | 88.48 | 82.94 | 77.52 | 72.33 | 67.41 | 62.83 | 58.59 | 54.70 | 51.16 | 47.93 | 45.00 | 42.34 | 39.93 | 37.74 | 35.74 | 33.92 |
| 9 | 88.31 | 82.18 | 76.22 | 70.55 | 65.26 | 60.37 | 55.92 | 51.89 | 48.26 | 45.00 | 42.07 | 39.44 | 37.07 | 34.94 | 33.01 | 31.26 |
| 8 | 88.10 | 81.24 | 74.63 | 68.41 | 62.68 | 57.48 | 52.83 | 48.68 | 45.00 | 41.74 | 38.84 | 36.27 | 33.98 | 31.93 | 30.10 | 28.44 |
| 7 | 87.83 | 80.05 | 72.63 | 65.76 | 59.56 | 54.05 | 49.22 | 45.00 | 41.32 | 38.11 | 35.30 | 32.83 | 30.65 | 28.72 | 27.00 | 25.46 |
| 6 | 87.48 | 78.50 | 70.06 | 62.43 | 55.73 | 49.95 | 45.00 | 40.78 | 37.17 | 34.08 | 31.41 | 29.09 | 27.07 | 25.29 | 23.72 | 22.33 |
| 5 | 86.98 | 76.38 | 66.65 | 58.15 | 50.97 | 45.00 | 40.05 | 35.95 | 32.52 | 29.63 | 27.17 | 25.07 | 23.25 | 21.66 | 20.27 | 19.04 |
| 4 | 86.24 | 73.33 | 61.94 | 52.53 | 45.00 | 39.03 | 34.27 | 30.44 | 27.32 | 24.74 | 22.59 | 20.76 | 19.19 | 17.84 | 16.66 | 15.63 |
| 3 | 85.03 | 68.62 | 55.18 | 45.00 | 37.47 | 31.85 | 27.57 | 24.24 | 21.59 | 19.45 | 17.67 | 16.19 | 14.93 | 13.85 | 12.91 | 12.09 |
| 2 | 82.72 | 60.59 | 45.00 | 34.82 | 28.06 | 23.35 | 19.94 | 17.37 | 15.37 | 13.78 | 12.48 | 11.40 | 10.49 | 9.71 | 9.04 | 8.46 |
| 1 | 76.92 | 45.00 | 29.41 | 21.38 | 16.67 | 13.62 | 11.50 | 9.95 | 8.76 | 7.82 | 7.06 | 6.44 | 5.92 | 5.47 | 5.09 | 4.76 |
| 0 | 33.75 | 13.08 | 7.28 | 4.97 | 3.76 | 3.02 | 2.52 | 2.17 | 1.90 | 1.69 | 1.52 | 1.38 | 1.27 | 1.17 | 1.09 | 1.01 |

Figure 4

Mid-Range between Maximum and Minimum (SIWL = 7, Truncate 3 LSBs)

| Q^, I\> | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 88.33 | 84.64 | 80.98 | 77.41 | 73.93 | 70.56 | 67.34 | 64.25 | 61.32 | 58.55 | 55.93 | 53.46 | 51.14 | 48.96 | 46.92 | 45.00 |
| 14 | 88.21 | 84.26 | 80.37 | 76.56 | 72.87 | 69.33 | 65.94 | 62.72 | 59.68 | 56.81 | 54.12 | 51.61 | 49.25 | 47.05 | 45.00 | 43.08 |
| 13 | 88.07 | 83.84 | 79.66 | 75.60 | 71.68 | 67.93 | 64.37 | 61.01 | 57.86 | 54.90 | 52.15 | 49.59 | 47.21 | 45.00 | 42.95 | 41.04 |
| 12 | 87.91 | 83.34 | 78.85 | 74.49 | 70.32 | 66.35 | 62.60 | 59.10 | 55.83 | 52.80 | 49.99 | 47.40 | 45.00 | 42.79 | 40.75 | 38.86 |
| 11 | 87.73 | 82.76 | 77.90 | 73.21 | 68.74 | 64.53 | 60.59 | 56.94 | 53.57 | 50.46 | 47.61 | 45.00 | 42.60 | 40.41 | 38.39 | 36.54 |
| 10 | 87.50 | 82.06 | 76.77 | 71.70 | 66.91 | 62.44 | 58.30 | 54.51 | 51.04 | 47.87 | 45.00 | 42.39 | 40.01 | 37.85 | 35.88 | 34.07 |
| 9 | 87.22 | 81.22 | 75.42 | 69.90 | 64.75 | 60.00 | 55.67 | 51.74 | 48.19 | 45.00 | 42.13 | 39.54 | 37.20 | 35.10 | 33.19 | 31.45 |
| 8 | 86.88 | 80.19 | 73.77 | 67.74 | 62.19 | 57.16 | 52.63 | 48.59 | 45.00 | 41.81 | 38.96 | 36.43 | 34.17 | 32.14 | 30.32 | 28.68 |
| 7 | 86.44 | 78.88 | 71.71 | 65.09 | 59.11 | 53.79 | 49.11 | 45.00 | 41.41 | 38.26 | 35.49 | 33.06 | 30.90 | 28.99 | 27.28 | 25.75 |
| 6 | 85.85 | 77.19 | 69.09 | 61.78 | 55.36 | 49.79 | 45.00 | 40.89 | 37.37 | 34.33 | 31.70 | 29.41 | 27.40 | 25.63 | 24.06 | 22.66 |
| 5 | 85.04 | 74.89 | 65.65 | 57.59 | 50.74 | 45.00 | 40.21 | 36.21 | 32.84 | 30.00 | 27.56 | 25.47 | 23.65 | 22.07 | 20.67 | 19.44 |
| 4 | 83.83 | 71.65 | 60.99 | 52.15 | 45.00 | 39.26 | 34.64 | 30.89 | 27.81 | 25.25 | 23.09 | 21.26 | 19.68 | 18.32 | 17.13 | 16.07 |
| 3 | 81.87 | 66.76 | 54.46 | 45.00 | 37.85 | 32.41 | 28.22 | 24.91 | 22.26 | 20.10 | 18.30 | 16.79 | 15.51 | 14.40 | 13.44 | 12.59 |
| 2 | 78.19 | 58.83 | 45.00 | 35.54 | 29.01 | 24.35 | 20.91 | 18.29 | 16.23 | 14.58 | 13.23 | 12.10 | 11.15 | 10.34 | 9.63 | 9.02 |
| 1 | 69.41 | 45.00 | 31.17 | 23.24 | 18.35 | 15.11 | 12.81 | 11.12 | 9.81 | 8.78 | 7.94 | 7.24 | 6.66 | 6.16 | 5.74 | 5.36 |
| 0 | 45.00 | 20.59 | 11.81 | 8.13 | 6.17 | 4.96 | 4.15 | 3.56 | 3.12 | 2.78 | 2.50 | 2.27 | 2.09 | 1.93 | 1.79 | 1.67 |

Figure 5

Mid-Range between Maximum and Minimum (SIWL = 6, Truncate 2 LSBs)

| Q^,I⟩ | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 88.57 | 84.86 | 81.19 | 77.59 | 74.09 | 70.71 | 67.46 | 64.36 | 61.41 | 58.62 | 55.98 | 53.50 | 51.17 | 48.98 | 46.92 | 45.00 |
| 14 | 88.47 | 84.50 | 80.58 | 76.75 | 73.04 | 69.47 | 66.06 | 62.82 | 59.76 | 56.88 | 54.17 | 51.64 | 49.27 | 47.06 | 45.00 | 43.08 |
| 13 | 88.35 | 84.09 | 79.89 | 75.80 | 71.85 | 68.08 | 64.49 | 61.11 | 57.93 | 54.96 | 52.19 | 49.62 | 47.22 | 45.00 | 42.94 | 41.02 |
| 12 | 88.21 | 83.61 | 79.09 | 74.70 | 70.49 | 66.49 | 62.72 | 59.19 | 55.90 | 52.84 | 50.02 | 47.41 | 45.00 | 42.78 | 40.73 | 38.83 |
| 11 | 88.05 | 83.05 | 78.15 | 73.43 | 68.92 | 64.68 | 60.71 | 57.02 | 53.63 | 50.50 | 47.63 | 45.00 | 42.59 | 40.38 | 38.36 | 36.50 |
| 10 | 87.86 | 82.38 | 77.04 | 71.93 | 67.09 | 62.58 | 58.41 | 54.58 | 51.08 | 47.89 | 45.00 | 42.37 | 39.98 | 37.81 | 35.83 | 34.02 |
| 9 | 87.62 | 81.57 | 75.71 | 70.14 | 64.93 | 60.14 | 55.76 | 51.80 | 48.22 | 45.00 | 42.11 | 39.50 | 37.16 | 35.04 | 33.12 | 31.38 |
| 8 | 87.32 | 80.57 | 74.08 | 67.98 | 62.37 | 57.27 | 52.70 | 48.62 | 45.00 | 41.78 | 38.92 | 36.37 | 34.10 | 32.07 | 30.24 | 28.59 |
| 7 | 86.94 | 79.31 | 72.04 | 65.33 | 59.27 | 53.89 | 49.15 | 45.00 | 41.38 | 38.20 | 35.42 | 32.98 | 30.81 | 28.89 | 27.18 | 25.64 |
| 6 | 86.44 | 77.66 | 69.44 | 62.02 | 55.49 | 49.85 | 45.00 | 40.85 | 37.30 | 34.24 | 31.59 | 29.29 | 27.28 | 25.51 | 23.94 | 22.54 |
| 5 | 85.73 | 75.42 | 66.01 | 57.79 | 50.82 | 45.00 | 40.15 | 36.11 | 32.73 | 29.86 | 27.42 | 25.32 | 23.51 | 21.92 | 20.53 | 19.29 |
| 4 | 84.69 | 72.24 | 61.33 | 52.29 | 45.00 | 39.18 | 34.51 | 30.73 | 27.63 | 25.07 | 22.91 | 21.08 | 19.51 | 18.15 | 16.96 | 15.91 |
| 3 | 82.98 | 67.41 | 54.71 | 45.00 | 37.71 | 32.21 | 27.98 | 24.67 | 22.02 | 19.86 | 18.07 | 16.57 | 15.30 | 14.20 | 13.25 | 12.41 |
| 2 | 79.72 | 59.42 | 45.00 | 35.29 | 28.67 | 23.99 | 20.56 | 17.96 | 15.92 | 14.29 | 12.96 | 11.85 | 10.91 | 10.11 | 9.42 | 8.81 |
| 1 | 71.57 | 45.00 | 30.58 | 22.59 | 17.76 | 14.58 | 12.34 | 10.69 | 9.43 | 8.43 | 7.62 | 6.95 | 6.39 | 5.91 | 5.50 | 5.14 |
| 0 | 45.00 | 18.43 | 10.28 | 7.02 | 5.31 | 4.27 | 3.56 | 3.06 | 2.68 | 2.38 | 2.14 | 1.95 | 1.79 | 1.65 | 1.53 | 1.43 |

Figure 6

Mid-Range between Maximum and Minimum (SIWL = 5, Truncate 1 LSB)

| Q^, I> | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 89.05 | 85.30 | 81.59 | 77.96 | 74.42 | 70.99 | 67.71 | 64.57 | 61.58 | 58.76 | 56.09 | 53.58 | 51.22 | 49.01 | 46.94 | 45.00 |
| 14 | 88.98 | 84.97 | 81.01 | 77.14 | 73.38 | 69.76 | 66.31 | 63.03 | 59.92 | 57.01 | 54.27 | 51.71 | 49.31 | 47.08 | 45.00 | 43.06 |
| 13 | 88.90 | 84.59 | 80.34 | 76.20 | 72.20 | 68.37 | 64.74 | 61.31 | 58.09 | 55.08 | 52.27 | 49.66 | 47.24 | 45.00 | 42.92 | 40.99 |
| 12 | 88.81 | 84.15 | 79.57 | 75.12 | 70.85 | 66.79 | 62.96 | 59.37 | 56.03 | 52.94 | 50.08 | 47.44 | 45.00 | 42.76 | 40.69 | 38.78 |
| 11 | 88.70 | 83.63 | 78.66 | 73.86 | 69.29 | 64.97 | 60.93 | 57.19 | 53.74 | 50.57 | 47.66 | 45.00 | 42.56 | 40.34 | 38.29 | 36.42 |
| 10 | 88.57 | 83.01 | 77.59 | 72.38 | 67.46 | 62.86 | 58.62 | 54.72 | 51.17 | 47.93 | 45.00 | 42.34 | 39.92 | 37.73 | 35.73 | 33.91 |
| 9 | 88.41 | 82.26 | 76.29 | 70.61 | 65.30 | 60.41 | 55.94 | 51.91 | 48.27 | 45.00 | 42.07 | 39.43 | 37.06 | 34.92 | 32.99 | 31.24 |
| 8 | 88.21 | 81.34 | 74.70 | 68.47 | 62.72 | 57.51 | 52.84 | 48.69 | 45.00 | 41.73 | 38.83 | 36.26 | 33.97 | 31.91 | 30.08 | 28.42 |
| 7 | 87.96 | 80.16 | 72.71 | 65.82 | 59.60 | 54.08 | 49.23 | 45.00 | 41.31 | 38.09 | 35.28 | 32.81 | 30.63 | 28.69 | 26.97 | 25.43 |
| 6 | 87.62 | 78.61 | 70.14 | 62.48 | 55.76 | 49.96 | 45.00 | 40.77 | 37.16 | 34.06 | 31.38 | 29.07 | 27.04 | 25.26 | 23.69 | 22.29 |
| 5 | 87.14 | 76.50 | 66.73 | 58.20 | 50.99 | 45.00 | 40.04 | 35.92 | 32.49 | 29.59 | 27.14 | 25.03 | 23.21 | 21.63 | 20.24 | 19.01 |
| 4 | 86.44 | 73.46 | 62.02 | 52.56 | 45.00 | 39.01 | 34.24 | 30.40 | 27.28 | 24.70 | 22.54 | 20.71 | 19.15 | 17.80 | 16.62 | 15.58 |
| 3 | 85.27 | 68.74 | 55.22 | 45.00 | 37.44 | 31.80 | 27.52 | 24.18 | 21.53 | 19.39 | 17.62 | 16.14 | 14.88 | 13.80 | 12.86 | 12.04 |
| 2 | 82.98 | 60.66 | 45.00 | 34.78 | 27.98 | 23.27 | 19.86 | 17.29 | 15.30 | 13.71 | 12.41 | 11.34 | 10.43 | 9.66 | 8.99 | 8.41 |
| 1 | 76.72 | 45.00 | 29.34 | 21.26 | 16.54 | 13.50 | 11.39 | 9.84 | 8.66 | 7.74 | 6.99 | 6.37 | 5.85 | 5.41 | 5.03 | 4.70 |
| 0 | 45.00 | 13.28 | 7.02 | 4.73 | 3.56 | 2.86 | 2.38 | 2.04 | 1.79 | 1.59 | 1.43 | 1.30 | 1.19 | 1.10 | 1.02 | 0.95 |

Figure 7

Mid-Range between Maximum and Minimum (SIWL = 4, Truncate 0 LSB)

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 90.00 | 86.19 | 82.41 | 78.69 | 75.07 | 71.57 | 68.20 | 64.98 | 61.93 | 59.04 | 56.31 | 53.75 | 51.34 | 49.09 | 46.97 | 45.00 |
| 14 | 90.00 | 85.91 | 81.87 | 77.91 | 74.05 | 70.35 | 66.80 | 63.43 | 60.26 | 57.26 | 54.46 | 51.84 | 49.40 | 47.12 | 45.00 | 43.03 |
| 13 | 90.00 | 85.60 | 81.25 | 77.01 | 72.90 | 68.96 | 65.22 | 61.70 | 58.39 | 55.30 | 52.43 | 49.76 | 47.29 | 45.00 | 42.88 | 40.91 |
| 12 | 90.00 | 85.24 | 80.54 | 75.96 | 71.57 | 67.38 | 63.43 | 59.74 | 56.31 | 53.13 | 50.19 | 47.49 | 45.00 | 42.71 | 40.60 | 38.66 |
| 11 | 90.00 | 84.81 | 79.70 | 74.74 | 70.02 | 65.56 | 61.39 | 57.53 | 53.97 | 50.71 | 47.73 | 45.00 | 42.51 | 40.24 | 38.16 | 36.25 |
| 10 | 90.00 | 84.29 | 78.69 | 73.30 | 68.20 | 63.43 | 59.04 | 55.01 | 51.34 | 48.01 | 45.00 | 42.27 | 39.81 | 37.57 | 35.54 | 33.69 |
| 9 | 90.00 | 83.66 | 77.47 | 71.57 | 66.04 | 60.95 | 56.31 | 52.13 | 48.37 | 45.00 | 41.99 | 39.29 | 36.87 | 34.70 | 32.74 | 30.96 |
| 8 | 90.00 | 82.87 | 75.96 | 69.44 | 63.43 | 57.99 | 53.13 | 48.81 | 45.00 | 41.63 | 38.66 | 36.03 | 33.69 | 31.61 | 29.74 | 28.07 |
| 7 | 90.00 | 81.87 | 74.05 | 66.80 | 60.26 | 54.46 | 49.40 | 45.00 | 41.19 | 37.87 | 34.99 | 32.47 | 30.26 | 28.30 | 26.57 | 25.02 |
| 6 | 90.00 | 80.54 | 71.57 | 63.43 | 56.31 | 50.19 | 45.00 | 40.60 | 36.87 | 33.69 | 30.96 | 28.61 | 26.57 | 24.78 | 23.20 | 21.80 |
| 5 | 90.00 | 78.69 | 68.20 | 59.04 | 51.34 | 45.00 | 39.81 | 35.54 | 32.01 | 29.05 | 26.57 | 24.44 | 22.62 | 21.04 | 19.65 | 18.43 |
| 4 | 90.00 | 75.96 | 63.43 | 53.13 | 45.00 | 38.66 | 33.69 | 29.74 | 26.57 | 23.96 | 21.80 | 19.98 | 18.43 | 17.10 | 15.95 | 14.93 |
| 3 | 90.00 | 71.57 | 56.31 | 45.00 | 36.87 | 30.96 | 26.57 | 23.20 | 20.56 | 18.43 | 16.70 | 15.26 | 14.04 | 12.99 | 12.09 | 11.31 |
| 2 | 90.00 | 63.43 | 45.00 | 33.69 | 26.57 | 21.80 | 18.43 | 15.95 | 14.04 | 12.53 | 11.31 | 10.30 | 9.46 | 8.75 | 8.13 | 7.59 |
| 1 | 90.00 | 45.00 | 26.57 | 18.43 | 14.04 | 11.31 | 9.46 | 8.13 | 7.13 | 6.34 | 5.71 | 5.19 | 4.76 | 4.40 | 4.09 | 3.81 |
| 0 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| Q^, I> | 0 | 1 | 2 | 3 | 4 | 5 | 6 | 7 | 8 | 9 | 10 | 11 | 12 | 13 | 14 | 15 |

Figure 8

Maximum Angle (Deg) Represented by a Cell (LSBs of Q are all 1's and are truncated; LSBs of I are all 0's)

| |Q^, I>|0|1|2|3|4|5|6|7|8|9|10|11|12|13|14|15|
|---|---|---|---|---|---|---|---|---|---|---|---|---|---|---|---|---|---|
|15| |90.00|86.40|82.82|79.30|75.86|72.52|69.30|66.21|63.25|60.45|57.79|55.28|52.91|50.69|48.59|46.62|
|14| |90.00|86.15|82.34|78.60|74.95|71.42|68.03|64.80|61.73|58.82|56.09|53.52|51.11|48.85|46.74|44.76|
|13| |90.00|85.88|81.80|77.80|73.92|70.18|66.61|63.23|60.03|57.03|54.22|51.59|49.14|46.86|44.74|42.77|
|12| |90.00|85.56|81.17|76.88|72.74|68.78|65.01|61.47|58.14|55.05|52.16|49.49|47.01|44.72|42.60|40.64|
|11| |90.00|85.19|80.44|75.82|71.38|67.17|63.19|59.48|56.03|52.84|49.90|47.19|44.70|42.41|40.31|38.37|
|10| |90.00|84.75|79.58|74.58|69.81|65.31|61.11|57.23|53.66|50.39|47.40|44.67|42.18|39.91|37.84|35.94|
|9| |90.00|84.22|78.55|73.10|67.95|63.15|58.72|54.67|50.99|47.65|44.64|41.92|39.45|37.22|35.20|33.36|
|8| |90.00|83.57|77.30|71.32|65.74|60.60|55.94|51.74|47.97|44.60|41.59|38.90|36.49|34.32|32.37|30.61|
|7| |90.00|82.76|75.75|69.15|63.07|57.59|52.70|48.37|44.55|41.19|38.22|35.60|33.27|31.21|29.36|27.70|
|6| |90.00|81.72|73.78|66.43|59.81|53.97|48.89|44.48|40.67|37.38|34.51|32.01|29.81|27.87|26.15|24.62|
|5| |90.00|80.34|71.20|62.95|55.75|49.60|44.40|40.01|36.29|33.14|30.43|28.11|26.09|24.32|22.77|21.39|
|4| |90.00|78.41|67.69|58.39|50.63|44.27|39.09|34.85|31.36|28.44|25.99|23.90|22.11|20.56|19.20|18.00|
|3| |90.00|75.53|62.70|52.25|44.09|37.78|32.86|28.97|25.84|23.29|21.18|19.41|17.90|16.60|15.47|14.48|
|2| |90.00|70.82|55.18|43.78|35.71|29.90|25.60|22.33|19.77|17.72|16.04|14.65|13.47|12.47|11.60|10.85|
|1| |90.00|61.93|43.15|32.01|25.11|20.56|17.35|15.00|13.19|11.77|10.62|9.67|8.88|8.21|7.63|7.13|
|0| |90.00|41.19|23.63|16.26|12.34|9.93|8.30|7.13|6.24|5.55|5.00|4.55|4.17|3.85|3.58|3.34|

Figure 9

Minimum Angle (Deg) Represented by a Cell (LSBs of I are all 1's and are truncated; LSBs of Q are all 0's)

| Q^,I> | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 15 | 86.66 | 82.87 | 79.15 | 75.52 | 72.00 | 68.61 | 65.38 | 62.30 | 59.39 | 56.64 | 54.06 | 51.63 | 49.36 | 47.23 | 45.24 | 43.38 |
| 14 | 86.42 | 82.37 | 78.40 | 74.53 | 70.80 | 67.23 | 63.85 | 60.64 | 57.63 | 54.80 | 52.16 | 49.69 | 47.40 | 45.26 | 43.26 | 41.41 |
| 13 | 86.15 | 81.79 | 77.53 | 73.40 | 69.44 | 65.68 | 62.13 | 58.79 | 55.68 | 52.78 | 50.09 | 47.59 | 45.28 | 43.14 | 41.15 | 39.31 |
| 12 | 85.83 | 81.12 | 76.53 | 72.10 | 67.89 | 63.91 | 60.19 | 56.73 | 53.51 | 50.55 | 47.82 | 45.30 | 42.99 | 40.86 | 38.89 | 37.09 |
| 11 | 85.45 | 80.33 | 75.35 | 70.59 | 66.10 | 61.89 | 57.99 | 54.40 | 51.10 | 48.08 | 45.33 | 42.81 | 40.51 | 38.41 | 36.48 | 34.72 |
| 10 | 85.00 | 79.38 | 73.96 | 68.82 | 64.01 | 59.57 | 55.49 | 51.78 | 48.41 | 45.36 | 42.60 | 40.10 | 37.84 | 35.78 | 33.91 | 32.21 |
| 9 | 84.45 | 78.23 | 72.28 | 66.71 | 61.56 | 56.86 | 52.62 | 48.81 | 45.40 | 42.35 | 39.61 | 37.16 | 34.95 | 32.97 | 31.18 | 29.55 |
| 8 | 83.76 | 76.81 | 70.23 | 64.16 | 58.64 | 53.71 | 49.33 | 45.45 | 42.03 | 39.01 | 36.34 | 33.97 | 31.86 | 29.97 | 28.27 | 26.75 |
| 7 | 82.87 | 75.00 | 67.67 | 61.03 | 55.15 | 49.99 | 45.52 | 41.63 | 38.26 | 35.33 | 32.77 | 30.52 | 28.53 | 26.77 | 25.20 | 23.79 |
| 6 | 81.70 | 72.65 | 64.40 | 57.14 | 50.91 | 45.60 | 41.11 | 37.30 | 34.06 | 31.28 | 28.89 | 26.81 | 24.99 | 23.39 | 21.97 | 20.70 |
| 5 | 80.07 | 69.44 | 60.10 | 52.22 | 45.73 | 40.40 | 36.03 | 32.41 | 29.40 | 26.85 | 24.69 | 22.83 | 21.22 | 19.82 | 18.58 | 17.48 |
| 4 | 77.66 | 64.89 | 54.29 | 45.91 | 39.37 | 34.25 | 30.19 | 26.93 | 24.26 | 22.05 | 20.19 | 18.62 | 17.26 | 16.08 | 15.05 | 14.14 |
| 3 | 73.74 | 57.99 | 46.22 | 37.75 | 31.61 | 27.05 | 23.57 | 20.85 | 18.68 | 16.90 | 15.42 | 14.18 | 13.12 | 12.20 | 11.40 | 10.70 |
| 2 | 66.37 | 46.85 | 34.82 | 27.30 | 22.31 | 18.80 | 16.22 | 14.25 | 12.70 | 11.45 | 10.42 | 9.56 | 8.83 | 8.20 | 7.66 | 7.18 |
| 1 | 48.81 | 28.07 | 19.18 | 14.47 | 11.59 | 9.66 | 8.28 | 7.24 | 6.43 | 5.78 | 5.25 | 4.81 | 4.44 | 4.12 | 3.85 | 3.60 |
| 0 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

Figure 10

RECTANGULAR-TO-POLAR CONVERSION ANGLE QUANTIZER

BACKGROUND OF THE INVENTION

This invention relates to rectangular-to-polar conversion in communication systems employing digital words, and more specifically relates to such conversion in which a portion of the digital words representing rectangular coordinates are truncated.

Figure 1:
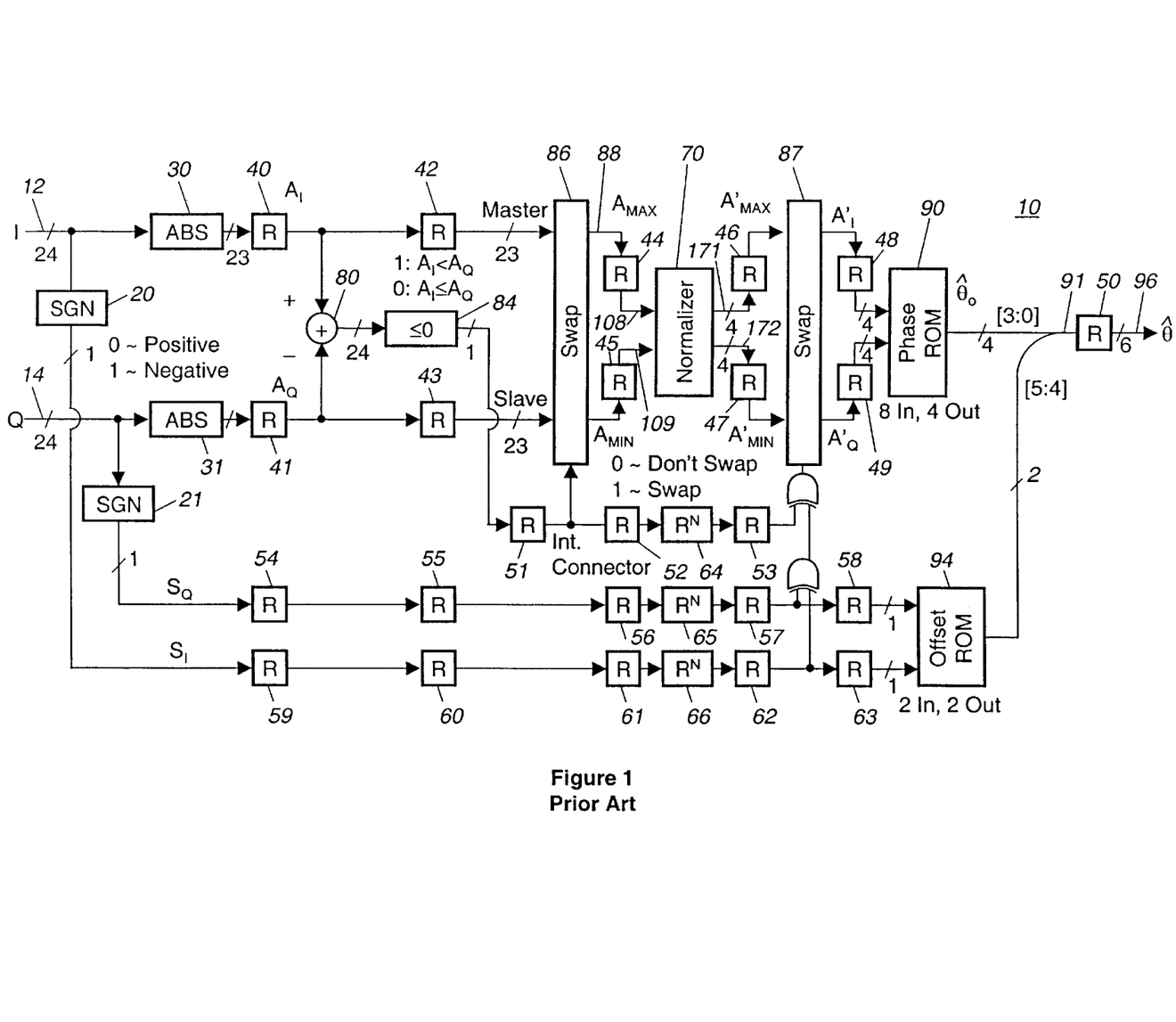
FIG. 1 is a schematic block diagram illustrating a prior are converter of phase information from rectangular to digital form.
Figure 2:
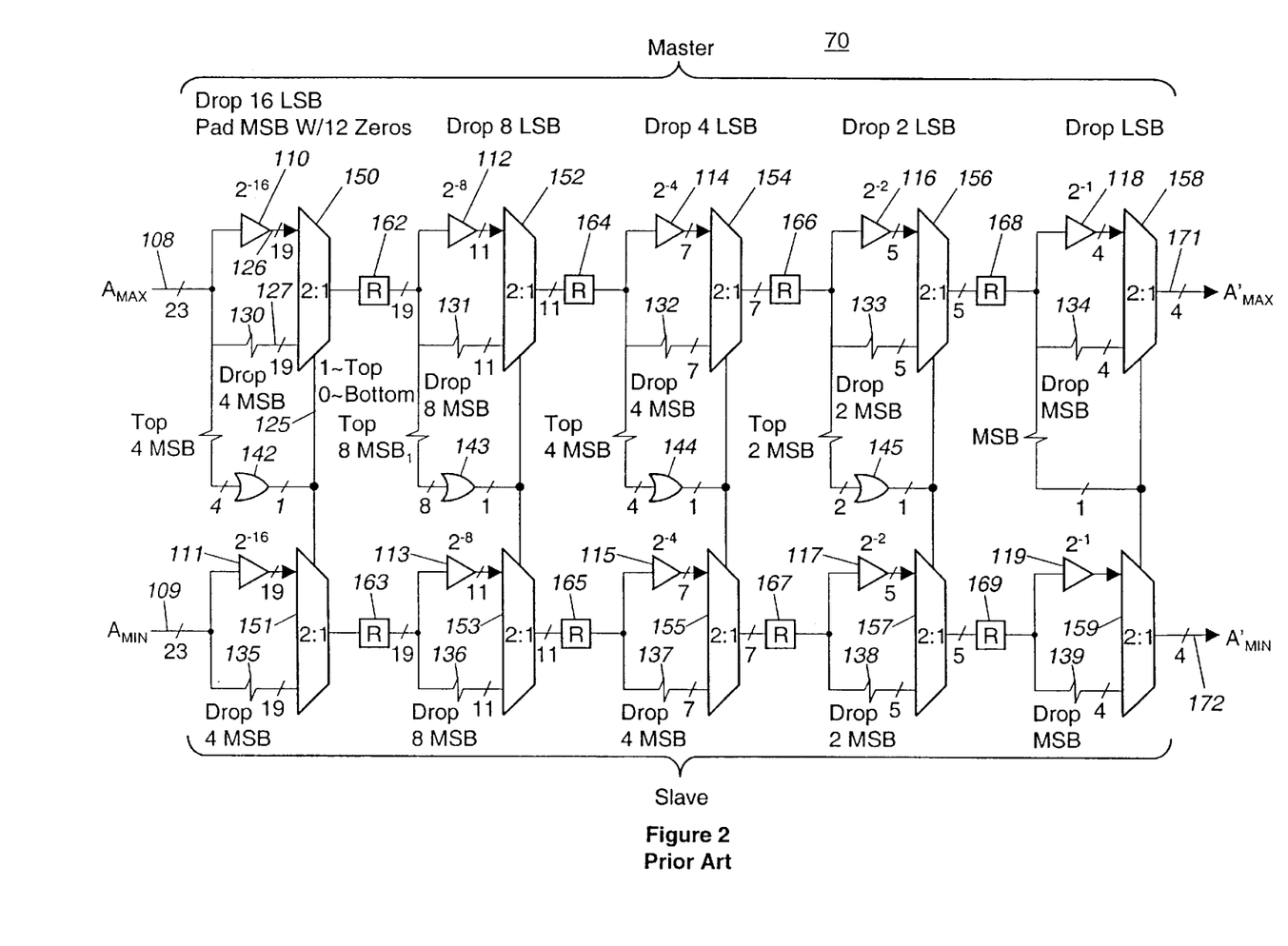
FIG. 2 is a schematic block diagram of the normalizer circuit shown in FIG. 1.

Rectangular-to-polar converters have been known in the past. One such angle converter 10 is shown in FIGS. 1 and 2. Referring to FIG. 1, converter 10 receives an I input on a 24-bit bus 12 and a Q input on a 24-bit bus 14. The I and the Q 24-bit words represent an angle in rectangular coordinate form. The sign bits of the I and Q input words are removed by sign bit removers 20 and 21. The sign bit is the most significant bit of the input I and Q words in which zero represents positive and 1 represents negative. The resulting 23-bit words are converted to their absolute values in circuits 30 and 31 which also map the phase angle represented by the input I and Q words into the first quadrant (0–90 degrees).

At various points in converter 10, the digital words are transmitted through delay registers 40–63. Additional delay registers 64–66 are sufficient in number to equal the pipeline delay of a normalizer 70 which is described in more detail on FIG. 2.

After the digital I and Q words are transmitted through registers 40 and 41, they are subtracted by a subtractor 80 and subjected to a comparator 84 which determines whether the I word or the Q word is larger. The I and the Q words are then transmitted through registers 42 and 43 and processed by a swap circuit 86. After further processing, the words are also processed by a similar swap circuit 87.

Swap circuit 86 places the I or Q word with the larger value as determined by comparator 84 on output 88.

After transmission through registers 44 and 45, the I and Q words are processed by normalizer 70 which truncates 19 of the 23 bits in the input words in the manner later described in connection with FIG. 2.

After transmission through registers 46 and 47, the truncated I and Q words are processed by swap circuit 87 which corresponds to outputs truncated version of I input (corresponding to bus 12) to register 48 and truncated version, of Q input (corresponding to bus 14) to register 49 if the I, Q input lies in quadrant 1 or 3 in the Cartesian plane. If the I, Q input lies in quadrant 2 or 4 in the Cartesian plane, swap circuit 87 outputs truncated version of Q input (bus 14) to register 48 and truncated version of I input (bus 12) to register 49.

After transmission through registers 48 and 49, the truncated I and Q words are used to address a signal generator, such as a phase angle read-only memory (ROM) 90. Since the original 23 bits of the I and Q words were truncated by normalizer 70, a single value of the resulting truncated words represent a larger range of phase angles than a single value of the original 23 bit I and Q words. According to the prior art, the integer value of the truncated words used to address the phase ROM was increased by 0.5 for both the I and Q words. Phase ROM 90 estimated the angle of the input I and Q words based on the truncated value increased by 0.5, and produced a resulting word indicating phase angle in polar coordinates on an output conductor 91.

The phase angle indicating word on conductor 91 was restored to its original quadrant by an offset read only memory 94. After passing through a register 50, the phase angle indicating digital word was transmitted over an output conductor 96.

Referring to FIG. 2, normalizer 70 comprises input buses 108–109, output buses 171–172 and multiplier circuits 110–119 which multiply the input value by an amount indicated by the power of 2 drawn immediately above the multiplier symbol in FIG. 2. Normalizer 70 also includes truncation functions 130–139 which truncate the number of most significant bits indicated immediately below the function symbol in FIG. 2.

Normalizer 70 also includes OR gates 142–145 connected as shown. Two to one multiplexers 150–159 transmit digital words conducted either to their top input or bottom input depending on a control signal. For example, referring to multiplexer 150, if the control signal on control conductor 125 represents a 1, then the input signal on input bus 126 is transmitted through multiplexer 150. On the other hand, if the value of the signal on conductor 125 represents a zero, then the input signal on bus 127 is conducted through multiplexer 150. The other multiplexers 151–159 operate in the same manner as multiplexer 150.

Normalizer 70 also includes delay registers 162–169 connected as shown.

In operation, normalizer 70, attempts to locate the most significant bit (MSB) of the 23 bit word transmitted on bus 108 which has a value of 1. The most significant bit with a value of 1, and the next three MSBs, are delayed and saved so that they appear on output 171 and are not truncated. If none of the 19 most significant bits of the input word on bus 108 has a value of 1, then the four least significant bits on input 108 are transmitted to the output on bus 171. The corresponding bits in the words transmitted to input 109 are treated the same as the bits transmitted to input 108.

The phase ROM 90 described in connection with FIG. 1 added a constant value to the integer represented by its inputs, more specifically, the value 0.5. This resulted in degraded accuracy. This invention addresses that deficiency and offers a solution.

BRIEF SUMMARY OF THE INVENTION

The preferred embodiment is useful in a communication system for converting phase information represented by digital words from rectangular form to polar form. In such an environment, an input receives one or more digital words representing an original phase angle in rectangular form. The input digital words are truncated by a plurality of bits to form truncated words. A variable phase signal representing a resultant phase angle range is generated and depends at least in part on the number of the bits truncated. The resultant phase angle range includes the original phase angle.

By using the foregoing techniques, phase information may be changed from rectangular to polar form with a degree of accuracy and economy previously unattainable.

BRIEF DESCRIPTION OF THE DRAWINGS

FIG. 4 illustrates a table of values representing an average phase angle of a corresponding range represented by the values shown in FIG. 3.

FIG. 5 illustrates a table of average angular values within a range of possible angular values represented by the I and Q words generated by normalizer 70 for the case of three least significant bits truncated by normalizer 70.

FIG. 6 illustrates a table of average angular values within a range of possible angular values represented by the I and Q words generated by normalizer 70 for the case of two least significant bits truncated by the normalizer 70.

FIG. 7 represents a table of average angular values within a range of possible angular values represented by the I and Q words generated by normalizer 70 for the case of one least significant bit truncated by a normalizer 70.

FIG. 8 illustrates a table of values representing average angular values within a range of possible angular values represented by the I and Q words generated by the normalizer 70 for the case of zero least significant bits truncated by the normalizer 70.

FIG. 9 illustrates a table of maximum possible angular values for each of the I and Q integers generated by normalizer 70 for the truncation of three least significant bits.

FIG. 10 illustrates a table of minimum possible angular values for each of the I and Q integers which can be generated by normalizer 70 for the truncation of three least significant bits.

DETAILED DESCRIPTION OF THE PREFERRED EMBODIMENTS

Figure 1A:
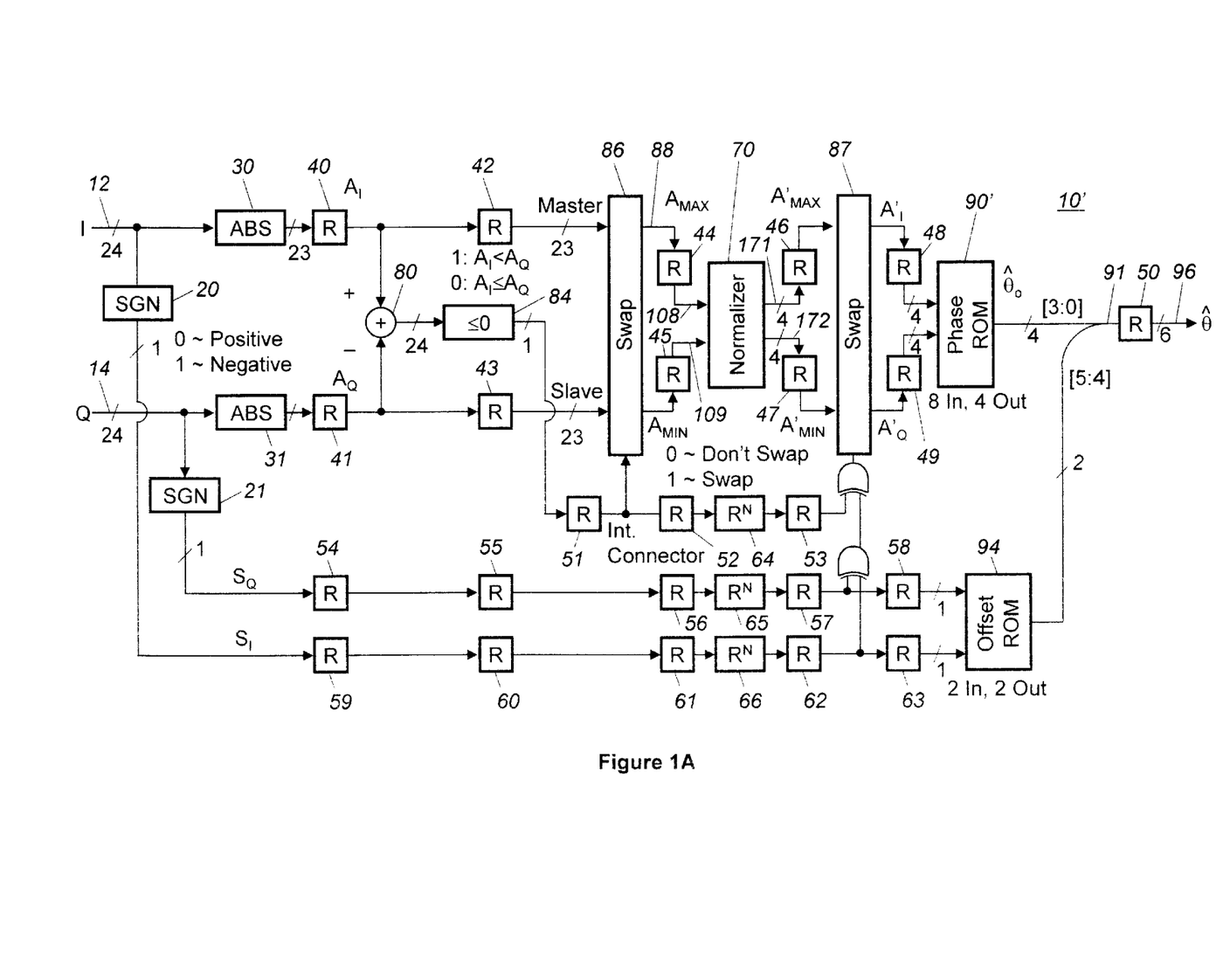
FIG. 1A is a schematic block diagram similar to FIG. 1, except that the phase ROM has been reorganized in accordance with the present invention.

The preferred embodiment of the invention is depicted in FIG. 1A, which shows a modified rectangular-to-polar converter 10' that employs the same circuitry as is illustrated in FIGS. 1 and 2, except that phase ROM 90' in FIG. 1A is completely reorganized to convert the integer of values generated by normalizer 70 to corresponding phase angles in a new and novel manner.

As previously explained, normalizer 70 truncates a 23-bit input I digital word and a 23-bit input Q digital word to a 4-bit output I digital word and a 4-bit output Q digital word, respectively. As previously explained, anywhere from zero to three least significant bits of the input words may be truncated for a version of the design with 7-bit input I digital word and 7-bit input Q digital word and 4-bit output words. Converter 10 does not identify which, if any, of the least significant bits were truncated.

Figure 3:
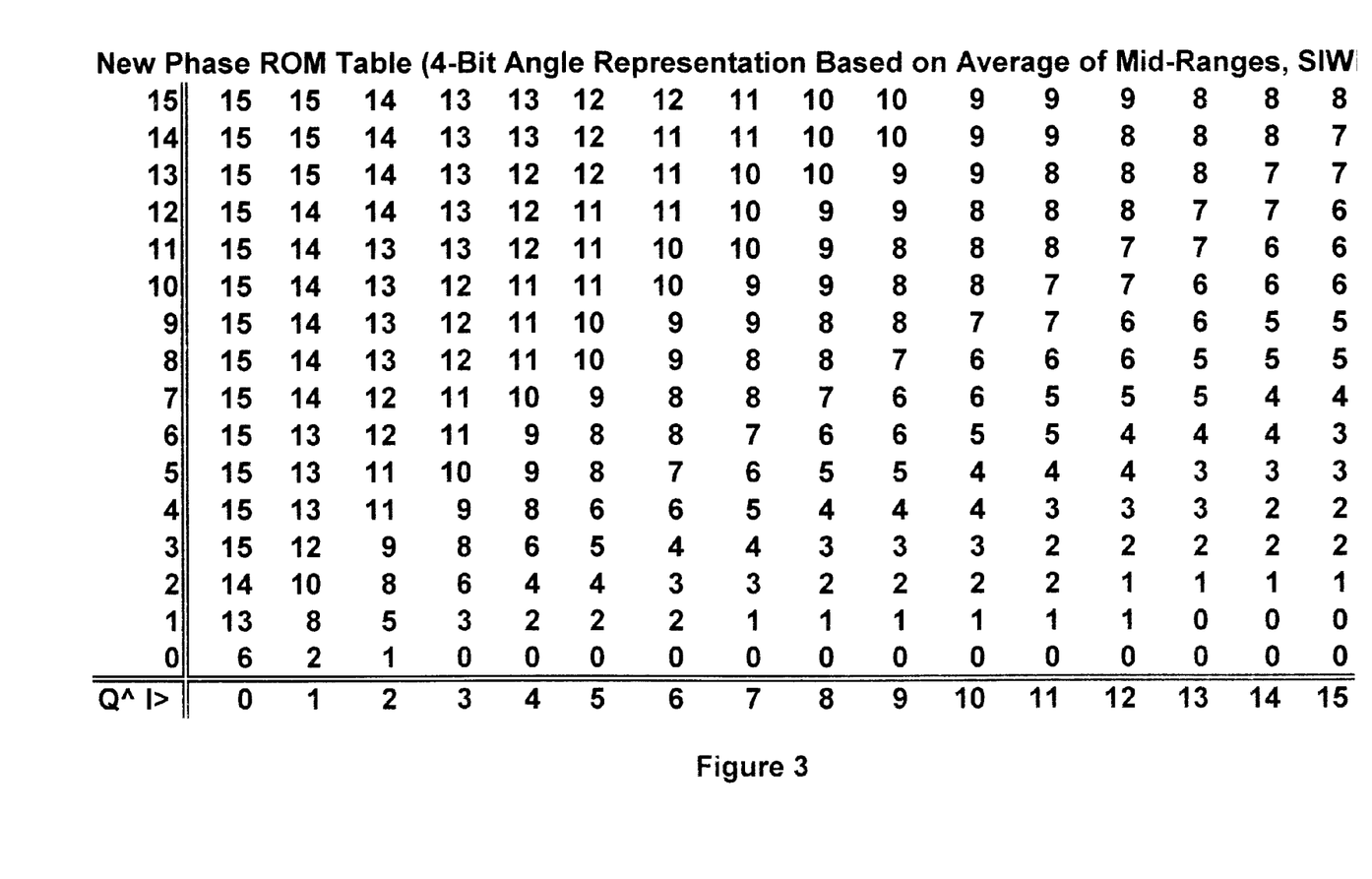
FIG. 3 illustrates a table of values representing ranges of phase angles stored in phase ROM 90' X corresponding to the I and Q integers generated by normalizer 70 shown in FIG. 1A according to a preferred embodiment of the invention.

The 4-bit output I and Q words from normalizer 70 are used as addresses for phase ROM 90'. A 4-bit word can represent any integer value in the range of 0 through 15. Each of these values is illustrated in FIG. 3. For example, if the 4-bit I word generated by normalizer 70 has the value 6 and the 4-bit Q word generated by normalizer 70 has the value 3, then, as shown in FIG. 3, phase ROM 90' generates a phase signal having the value 4 which is transmitted to output conductor 91. As shown in FIG. 4, for an I output equal to 6 and a Q output equal to 3, the value 4 stored in ROM 90' represents an average angle of 27.57 degrees. However, since a limited number of values are stored in ROM 90' the value 4 indicates a range of resultant phase angles, the average of which is indicated in the table of FIG. 4.

The derivation of the values in FIG. 4 is explained with reference to FIGS. 5 through 10. Considering first FIG. 9, assuming as in the previous example that the I word generated by normalizer 70 has a value of 6 and the Q word generated by normalizer 70 has a value of 3, for the case of three least significant bits being truncated, the maximum angle that can be represented is 32.86 degrees. Likewise, as shown in FIG. 10, the minimum angle represented is 23.57. The average of 23.57 and 32.86 is 28.22, which is the value shown for I=6 and Q=3 in FIG. 5. Similar average or mid-range values for the case of truncation of two least significant bits, one least significant bit and zero least significant bits is shown in FIGS. 6–8 respectively.

As shown by FIGS. 3–8, the normalizer 70 is connected to truncate a variable plurality of numbers of least significant bits up to a maximum number of least significant bits. This point is illustrated specifically by FIGS. 5–8 which show truncation for 3–0 least significant bits.

As described in connection with FIG. 3, the truncated 4-bit words generated by normalizer 70 represent a range of phase angles in polar coordinates which include the original phase angle represented by the input I and Q words to normalizer 70 on busses 12 and 14 in rectangular coordinates. The values of the 4-bit I and Q words generated by normalizer 70 are used as addresses for phase ROM 90' in order to generate a phase angle signal representing a resultant phase angle range in polar coordinates derived from the average of the truncation phase angles represented by FIGS. 5–8. The phase angle signal (e.g., the value 4 corresponding to I=6, Q=3 in FIG. 3) represents a resultant phase angle range derived from the average values illustrated in FIGS. 5–8 and depending in part on the number of least significant bits truncated by normalizer 70. The output phase angle signal transmitted to bus 91 also represents the phase angle range which includes the original phase angle of the I and Q words represented in rectangular coordinates that were transmitted to the inputs of normalizer 70.

Those skilled in the art will recognize that only the preferred embodiments have been described in the specification, and that the preferred embodiments may be modified and altered without departing from the true spirit and scope of the invention as defined in the accompanying claims. For example, the average angular values shown in FIGS. 4–8 may be replaced by other values between a maximum value and a minimum value as shown in FIGS. 9 and 10.

What is claimed is:

1. In a communication system, apparatus for converting phase information represented by digital words comprising a plurality of bits from rectangular form to polar form comprising in combination:

an input receiving one or more of said digital words representing an original phase angle in rectangular form;

a normalizer connected to truncate a plurality of the bits of said digital words to form truncated words; and a signal generator connected to generate a variable phase angle signal representing a resultant phase angle range including said original phase angle depending at least in part on the number of said bits truncated by said normalizer;

wherein the plurality of truncated bits comprise least significant bits of said digital words, wherein said normalizer truncates a maximum number of said least significant bits, and wherein said resultant phase angle range depends at least in part on said maximum number.

2. Apparatus, as claimed in claim 1, wherein the signal generator comprises a digital memory.

3. Apparatus, as claimed in claim 2, wherein the memory comprises a read only memory.

4. Apparatus, as claimed in claim 2, wherein the address for the memory is derived from the truncated words.

5. In a communication system, apparatus for converting phase information represented by digital words comprising a plurality of bits from rectangular form to polar form comprising in combination:

an input receiving one or more of said digital words representing an original phase angle in rectangular form;

a normalizer connected to truncate a plurality of the bits of said digital words to form truncated words; and a signal generator connected to generate a variable phase angle signal representing a resultant phase angle range including said original phase angle depending at least in part on the number of said bits truncated by said normalizer;

wherein said normalizer truncates a variable plurality of numbers of least significant bits up to a maximum number of least significant bits from said digital words to form truncated words representing a range of phase angles including the original phase angle, each of said variable plurality of numbers representing a different range of truncation phase angles including the original phase angle; and wherein said resultant phase angle range is derived at least in part from an average of the truncation phase angles.

6. In a communication system, a method for converting phase information represented by digital words comprising a plurality of bits from rectangular form to polar form comprising in combination:

receiving one or more of said digital words representing an original phase angle in rectangular form;

truncating a plurality of the bits of said digital words to form truncated words using a normalizer; and generating a variable phase angle signal representing a resultant phase angle range including said original phase angle depending at least in part on the number of said bits truncated by said normalizer;

wherein said plurality of truncated bits comprise least significant bits of said digital words, wherein the truncating comprises truncating a maximum number of said least significant bits, and wherein said resultant phase angle range depends at least in part on said maximum number.

7. A method, as claimed in claim 6, wherein said generating comprises storing a plurality of variable phase angle signals.

8. A method, as claimed in claim 7, wherein said generating comprises reading at least one of the stored variable phase angle signals.

9. A method, as claimed in claim 8, wherein the address for the reading is derived from the truncated words.

10. In a communication system, a method for converting phase information represented by digital words comprising a plurality of bits from rectangular form to polar form comprising in combination:

receiving one or more of said digital words representing original phase angle in rectangular form;

truncating a plurality of the bits of said digital words to form truncated words using a normalizer; and generating a variable phase angle signal representing resultant phase angle range including said original phase angle depending at least in part on the number of said bits truncated by said normalizer;

wherein said truncating comprises truncating a variable plurality of numbers of least significant bits up to a maximum number of least significant bits from said digital words to form said truncated words representing a range of phase angles including the original phase angle, each of said variable plurality of numbers representing a different range of truncation phase angles including the original phase angle; and wherein said resultant phase angle range is derived at least in part from an average of the truncation phase angles.

* * * * *